(12) United States Patent
Boge et al.

(10) Patent No.: US 7,373,852 B2
(45) Date of Patent: May 20, 2008

(54) PROTECTED LENGTH MEASURING SYSTEM

(75) Inventors: Ludwig Boge, Jenapriessnitz/Wogau (DE); Hans-Joachim Freitag, Jena (DE); Heinz-Gunther Franz, Hamburg (DE); Andreas Schmidt, Erfurt (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/532,800

(22) PCT Filed: Oct. 2, 2003

(86) PCT No.: PCT/EP03/10987

§ 371 (c)(1),
(2), (4) Date: Dec. 27, 2005

(87) PCT Pub. No.: WO2004/038338

PCT Pub. Date: May 6, 2004

(65) Prior Publication Data

US 2006/0162473 A1    Jul. 27, 2006

(30) Foreign Application Priority Data

Oct. 25, 2002  (DE)  ............................... 102 49 884

(51) Int. Cl.
  *G01D 21/00*  (2006.01)
(52) U.S. Cl. .................................................. 73/866.5
(58) Field of Classification Search ...................... None
  See application file for complete search history.

(56) References Cited

U.S. PATENT DOCUMENTS

| 4,972,599 | A | * | 11/1990 | Ernst ............................ 33/706 |
|---|---|---|---|---|
| 5,036,597 | A | | 8/1991 | Falkinger et al. |
| 5,038,491 | A | * | 8/1991 | Tsukiji et al. .................. 33/702 |
| 6,119,357 | A | * | 9/2000 | Ochiai et al. .................. 33/708 |
| 6,145,213 | A | * | 11/2000 | Shimano et al. ............... 33/702 |
| 6,349,481 | B1 | | 2/2002 | Nelle |
| 6,415,524 | B1 | * | 7/2002 | Muller et al. .................. 33/706 |
| 6,904,695 | B2 | | 6/2005 | Freitag et al. |
| 2002/0112360 | A1 | | 8/2002 | Brumbaugh |
| 2003/0172515 | A1 | | 9/2003 | Tondorf et al. |
| 2004/0040139 | A1 | | 3/2004 | Tondorf |

FOREIGN PATENT DOCUMENTS

DE    30 20 003 A1    12/1981

(Continued)

*Primary Examiner*—Robert Raevis
(74) *Attorney, Agent, or Firm*—Patterson, Thuente, Skaar & Christensen, P.A.

(57) ABSTRACT

What is described is a length measurement system and method for measuring relative movements between first and second machine parts, said measurement system comprising a sensing head and a rule sensed by it, said sensing head being securely mountable on the first machine part and said rule being connectable with the second machine part during final assembly of the length measurement system, wherein the rule is mounted within a profiled part which is securely mountable on the second machine part in final assembly and into which the sensing head protrudes, said sensing head being preadjusted, via a removable mounting element, and being releasably connected with said profiled part, in a state prepared for final assembly, or said sensing head, when finally assembled, protruding into the profiled part without being supported thereon.

16 Claims, 10 Drawing Sheets

FOREIGN PATENT DOCUMENTS

| | | |
|---|---|---|
| DE | 86 16 206.3 | 9/1986 |
| DE | 38 20 331 A1 | 12/1989 |
| DE | 40 17 858 A1 | 12/1991 |
| DE | 295 21 403 U1 | 5/1997 |
| DE | 199 14 311 A1 | 10/2000 |
| DE | 199 18 654 A1 | 10/2000 |
| DE | 100 56 947 A1 | 5/2002 |
| DE | 102 04 097 A1 | 8/2002 |

* cited by examiner

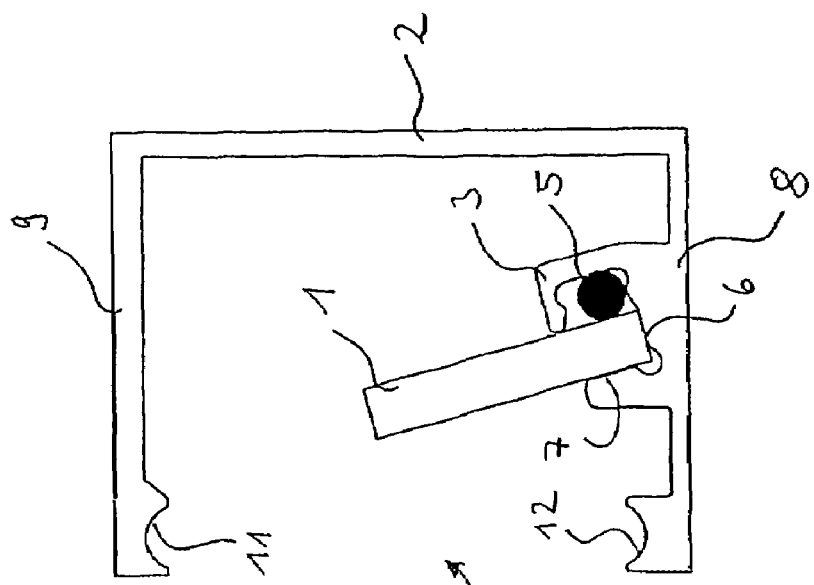
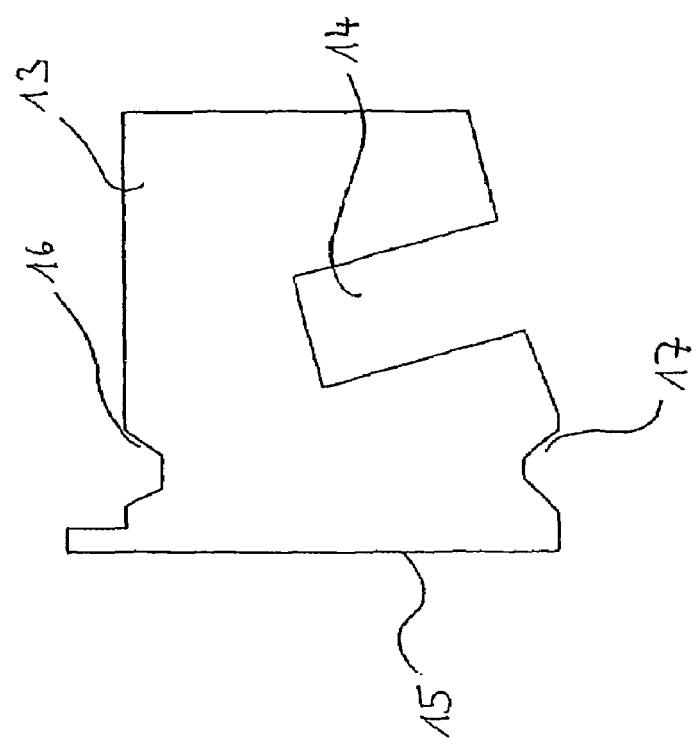
Fig. 3

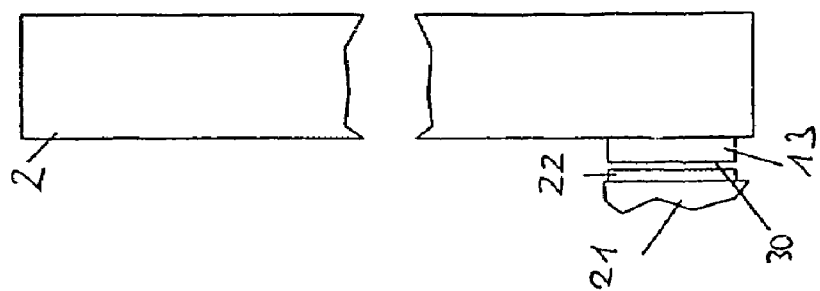
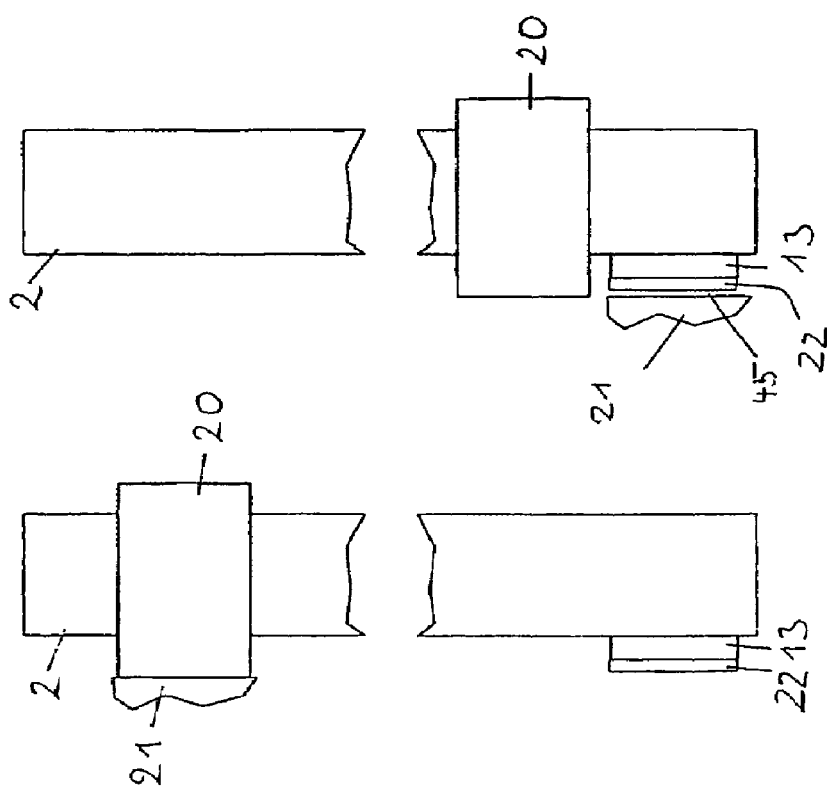
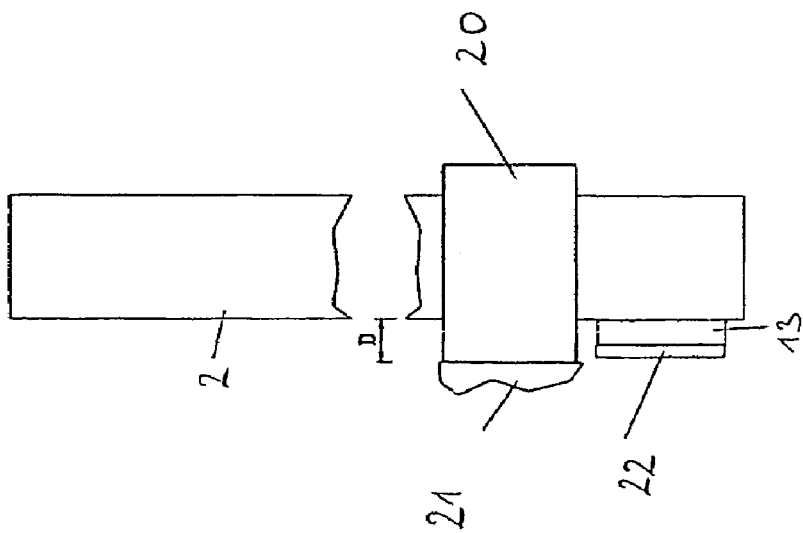

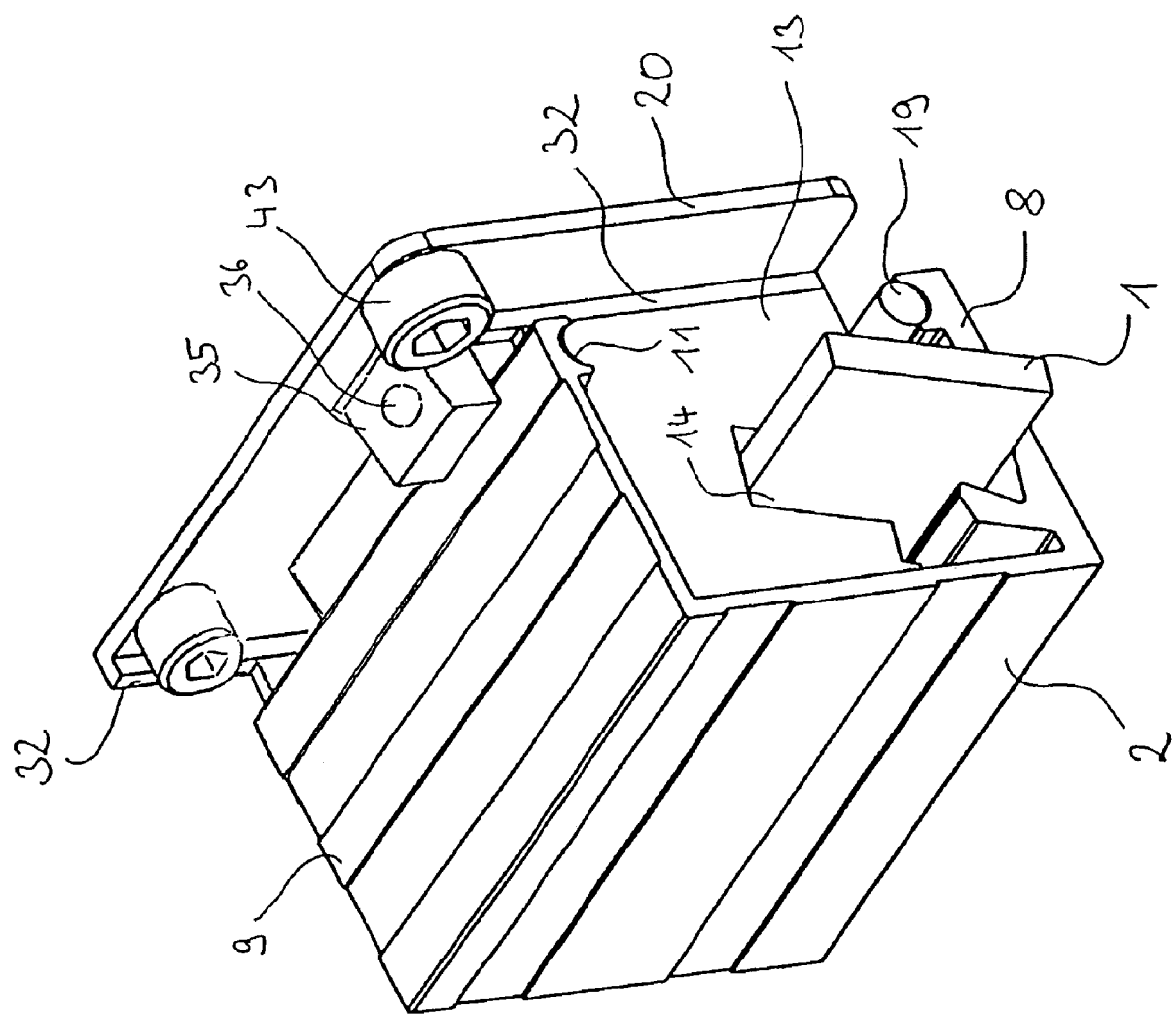

PROTECTED LENGTH MEASURING SYSTEM

BACKGROUND OF THE INVENTION

The invention relates to a protected length measurement system for measuring relative movements between a first machine part and a second machine part, which system comprises a sensing head and a rule sensed by it, said sensing head being securely mountable on the first machine part and said rule being connectable with the second machine part during final assembly of the length measurement system. The invention further relates to a method of final assembly of such length measurement system.

Length measurement systems for measuring relative movements between a first and a second machine part are known and are often used in machine tools, for example in order to sense the movement of a machine head or of a machine carriage relative to a machine bench. For this purpose, use is conventionally made of a rule which is mounted on the machine bench. A sensing head senses the rule, which may be effected in a non-contacting as well as in a contacting manner. However, because of their higher precision of measurement, optical, and thus non-contacting, sensing principles have found acceptance.

Length measurement systems of the aforementioned type may be divided into two categories: open and encapsulated measurement systems. In open measurement systems, the rule is openly mounted on the machine bench, and the sensing head mounted on the machine head moves above the rule. In encapsulated measurement systems, the rule is located in a closed capsule, in which the sensing head is also located. The sensing head runs on guiding elements located within the capsule and is connected with the machine head via a linking element so as to move along with it. An encapsulated measurement system is shown, for example, in DE 3,020,003 A1.

While encapsulated measurement systems achieve greater protection than open systems of the rule and of the sensing head against soiling, they do so at the cost of a great constructional complexity. Encapsulated measurement systems are accordingly more expensive than open measurement systems.

The mounting of a length measurement system on a machine, for example, on a machine tool, requires adjustment to the particular conditions present. The positions of the mounting spots for the rule as well as for the sensing head can be specified only within certain tolerances. For example, a certain tolerance is given with regard to the angle at which the mounting surfaces for the rule and for the sensing head are located relative to each other. In this connection, encapsulated measurement systems are advantageous because the sensing head, being guided within the capsule, is not connected directly with the machine head, but via a relatively easy to modify linking element. Said linking element needs to have as little clearance as possible in the direction of measurement. In the other directions, especially along the axis of the linking element, there is a certain flexibility simply because, due to the guiding means for the sensing head in the capsule, the distance between the machine head and the guiding means in the capsule may vary somewhat along the measured path to be covered.

In open systems, whose sensing head is usually securely attached to the machine head, no such flexibility is present, so that they require greater precision in terms of the relative positions of the mounting surfaces for the sensing head and the rule. This makes final assembly more difficult.

Therefore, it is the object of the invention to provide a length measurement system which achieves improved protection of the sensing head and of the rule with reduced technical complexity.

SUMMARY OF THE INVENTION

According to the invention, this object is achieved by a length measurement system for measuring relative movements between a first machine part and a second machine part, said measurement system comprising a sensing head and a rule sensed by it, said sensing head being securely mountable on the first machine part and said rule being connectable with the second machine part during final assembly of the length measurement system, wherein the rule is mounted in a profiled part which is securely mountable on the second machine part during final assembly and into which the sensing head protrudes, said sensing head being preadjusted, via a removable mounting element, and being releasably connected with said profiled part, in a state prepared for final assembly, or said sensing head, when finally assembled, protruding into the profiled part without being supported thereon.

According to the invention, the object is further achieved, in terms of simplified mounting, in such a length measurement system, in that, for final assembly, the profiled part is aligned with and mounted on the second machine part, the sensing head is securely mounted on the first machine part in a gap-filling manner and then the mounting element is removed so as to release the connection between the profiled part and the sensing head.

Thus, according to the invention, a profiled part is employed, which not only has protective functions for the rule, but also surrounds the sensing head, in particular in the region where optical elements are located. In doing so, the sensing head is securely mounted on the machine part such that it does not require any guiding contact with the profiled part. Accordingly, the profiled part can be of a simpler design, in this connection, and need not guide the sensing head. The sensing head merely follows the movement of the first machine part on which it is securely mounted.

The alignment of the sensing head and of the rule in the mounted condition is achieved by correspondingly adjusting the profiled part, which contains the rule, relative to the sensing head. The predetermined movement between the first machine part carrying the sensing head and the profiled part carrying the rule, said profiled part being mounted on the second machine part, automatically provides the correct position, in the finally assembled condition, between the sensing head and the rule, as required for precise measurement.

Prior to final assembly, this adjusted condition is secured by a removable mounting element which releasably connects the sensing head with the profiled part.

In the length measurement system according to the invention, the mounting of the profiled part on the second machine part is conveniently effected while the sensing head and the profiled part are still connected with each other. In doing so, use may be made, in particular, of form-locking or substance-locking connections, with a substance-locking connection in the form of an adhesive joint having the advantage that it may also be effected by untrained personnel when mounting the length measurement system on a machine. Therefore, the profiled part preferably comprises an adhesive surface by which it can be adhered to the second machine part.

The profiled part protects the rule. Further, it also has a certain protective function for the sensing head. In this connection, the profiled part is preferably profiled in a U-shaped manner comprising two legs, one of said legs being mounted on the second machine part and carrying the rule at its interior surface, and the other of said legs embracing the sensing head in a non-contacting manner during measurement.

The sensing head embracing the rule in a non-contacting manner usually protrudes deeply into the profiled part, so that it is particularly well protected. Especially the exposed optical parts of the sensing head are then preferably located within the profiled part. This reduces the risk of mechanical damage to the sensing head. In addition, the risk of soiling is strongly reduced for the rule because it is located within the U-shaped, profiled part and within a measuring gap of the sensing head. In this embodiment, the profiled part is provided in the manner of a capsule profile or a U-shaped rail, having the rule located therein.

Moreover, in this embodiment, the sensing head may be simply connected with the profiled part by establishing a connection between the two legs of the profiled part and the sensing head. Mounting elements by which this is achieved have the additional advantage that the rule, which is located inside the profiled part, cannot be affected by the mounting element which secures the preadjusted condition.

For the mounting element, use can be made of any suitable form- or force-locking type of mounting which ensures a rigid connection between the sensing head and the profiled part in the preadjusted condition and which is releasable while maintaining said preadjusted condition. A mounting element having a particularly simple and yet highly precise design is provided in the form of two spacing members of cylindrical cross-section, which are clamped by the legs of the profiled part in grooves on the sensing head. In this connection, it is convenient to form the profiled part with a resilient portion which provides the corresponding tension. Such spacing members can then be removed without a tool simply by being pulled out so as to release the connection between the sensing head and the profiled part. Moreover, the desired adjustment between the sensing head and the profiled part can be very precisely effected due to the cross-section of the spacing members and the tension exerted by the profiled part.

In a preferred embodiment, the profiled part is mounted directly on the second machine part. Thus, the position of the rule in the profiled part is decisive for the orientation of the rule relative to the second machine part. Accordingly, a high-precision alignment of the rule within the profiled part is conducive to the precision of measurement. Therefore, in this connection, it is preferred that the profiled part comprise a reference surface for alignment of the rule, which reference surface is contacted by the rule in its mounted state. A particularly exact alignment is achieved by using two reference surfaces located at an angle to each other (preferably 90°). The reference surfaces align the rule within the profiled part.

Since, in some cases, different materials are used for the rule and for the profiled part, it is advantageous to compensate for thermal stresses between the rule and the profiled part and, at the same time, to ensure that the rule securely contacts the aligning reference surface. This may be achieved particularly easily by means of a bracing device which braces the rule in a direction toward the reference surface. As the bracing device, use can be made, for example, of a spring mechanism or of suitable elastic means, such as a rubber band.

By protruding into the profiled part, the sensing head is protected against soiling. In a non-contacting manner, the sensing head senses the rule located within the profiled part. For optical sensing, in which radiation is passed through the rule, the sensing head, which protrudes into the profiled part, preferably embraces the rule mounted thereon, on three sides and in a non-contacting manner, during measurement. This trilateral embrace allows not only an optical transparency measurement on the rule, which is known for its high precision of measurement, but, at the same time, it also provides still further protection against soiling of the optical parts of the sensing head, since these then contact the flanks of a measuring gap into which the rule protrudes in a non-contacting manner. This stronlgy reduces soiling of the optical structural components.

The length measurement system according to the invention is particularly easy to mount by first aligning the profiled part relative to the second machine part and mounting it thereon and, then, mounting the sensing head on the second machine part in a gap-filling manner. In doing so, the alignment of the profiled part should be effected such that, during the relative movement of the first and second machine parts, the predetermined adjustment between the sensing head and the rule is maintained when the sensing head is guided by the first machine part.

The predetermined relative movement of the two machine parts and the fixed adjustment positions of the profiled part and of the sensing head lead to a redundancy of determination of said parts, which generally results in a usually wedge-shaped gap between a mounting surface of the sensing head and the first machine part. This problem of a redundancy of determination is eliminated by mounting the sensing head on the first machine part in a gap-filling manner, for example by an adhesive joint or by suitably adjustable leveling pieces.

The alignment of the profiled part along the longitudinal axis of the relative movement, i.e. at a constant distance from the first machine part, is essential for constantly providing the ideal position of the sensing head to be mounted on the first machine part and the rule, causing as little error of measurement as possible. Therefore, for mounting, the profiled part preferably is roughly aligned with the longitudinal axis of the relative movement and is then adjusted, by means of a gauge, along the longitudinal axis, at a constant distance from the first machine part, said first and said second machine parts being moved relative to each other so as to adjust said constant distance. This procedure ensures that, even after mounting on the first machine part, the sensing head is always at a predetermined position relative to the rule.

Since the sensing head is mounted on the first machine part in a gap-filling manner, it is convenient to adjust a predetermined gap between the first machine part and the sensing head, using the gauge, before mounting the sensing head on the first machine part. The gap-filling mounting then fills this predetermined gap as well as any deviations caused by tolerances.

For this purpose, an adhesive joint may be used for gap-filling mounting. The same applies to the mounting of the profiled part.

In this connection, a measurement system is advantageous which comprises a part in the form of a sensing head which is mountable on a machine part by a mounting surface, using an adhesive, and which comprises a mounting plate releasably mountable on the machine part and, together with the mounting surface, limiting a volume for adhesive into which the adhesive may be filled from above, said volume for adhesive being limited at the bottom and on each side between the part and the mounting plate in a manner sealed with respect to the adhesive. The object is further achieved by a method of mounting the part of such a measurement system on the machine part, wherein the part is adjusted in a predetermined position on the machine part and securely mounted thereon by securely mounting the mounting plate on the machine part, after said adjustment, and then filling adhesive into the volume for adhesive so as to securely connect the part with the mounting plate.

Thus, a mounting plate is then used for the measurement system, said mounting plate being releasably mountable on the machine part and being adhered to the mounting surface of the part, such as a sensing head. This considerably reduces the tolerances required for the mounting surface on the machine part; possible deviations, which might, for example, result in a wedge-shaped gap in the mounting surface, are compensated for by said adhesive joint. The volume for adhesive formed between the mounting plate and the mounting surface allows gap-filling mounting of the part on the machine part, so that the mounting of the part does not have any negative effects on its adjusted position, which is because, in particular, mounting can be effected, free from stresses, by filling up the volume for adhesive with adhesive.

Moreover, the use of the mounting plate on the measurement system ensures a defined material coupling between the mounting plate, on the one hand, and the mounting surface, on the other hand. This increases the quality of the adhesive joint. Morevoer, this provides greater freedom in selecting the adhesive, and allows the shape and size of the volume for adhesive to be optimally designed for an adhesive.

The mounting plate is releasably mounted on the machine part. This allows the part to be released from the machine part even after jointing. This would not be possible if jointing were effected without the mounting plate.

As a further advantage, no adhesion surface needs to be prepared on the machine part, which is often difficult, in particular with regard to machine tools, because soiling by oil residues is usually unavoidable. Also, said gluing need no longer be effected by specially trained personnel. Limiting the volume for adhesive prevents adhesive from flowing out of the gap between the mounting plate and the mounting surface before curing, which would lead, on the one hand, to soiling and, on the other hand, to an uncontrollable amount of adhesive in the adhesive gap. Any means preventing the adhesive from flowing out is suitable for such limitation. Thus, the term "sealed" is to be understood as referring to the viscosity and to the flow characteristics of the adhesive. Therefore, sealing must be ensured with regard to the adhesive to be filled in.

Particularly easy sealing is achievable if the mounting plate or the mounting surface of the part comprises a projecting structure which seals the volume for adhesive between the mounting surface and the mounting plate.

In most cases, the mounting surface of the part is approximately rectangular. For such cases, the projecting structure which achieves said sealing conveniently has a U shape. The adhesive can then be filled in at the top of said "U".

Limiting the volume for adhesive to be sealed must be ensured even if the gap between the mounting plate and the mounting surface varies. Such variations may be caused by tolerances with regard to the mounting surface on the machine part. In this connection, for example, elastic sealing means are conceivable which still have a sufficient sealing effect even if there is a certain variation of the adhesive gap. Particularly great insensitivity to variations in the adhesive gap is achieved by a recess formed on the mounting surface or on the mounting plate, into which the projecting structure protrudes. This design allows particularly great tolerances for the mounting surface on the machine part.

Therefore, the projecting structure is preferably a sealing means, for example a metal web, a metallic or non-metallic seal, in particular an elastomeric seal. Good mounting is achieved for such sealing means if a depression is provided in which the sealing means is placed. In this connection, the projecting structure, therefore, preferably comprises a sealing means placed in a depression.

Filling the adhesive into the gap forming the volume for adhesive is effected from above, said volume for adhesive being provided, in most cases, as a pocket for adhesive.

Since an adhesive gap having a gap width in the range of a few tenths of a millimeter is present in many mechanical applications, it is convenient to provide auxiliary means for filling in the adhesive so as to simplify said filling and to allow it being effected also by untrained personnel. Therefore, the mounting plate preferably comprises a funnel tube feeding the volume for adhesive from above. Said funnel tube ideally cooperates with an oblique inlet surface on the part so that the entire quantity of adhesive enters directly into the volume for adhesive by simply being filled in.

As already mentioned, the releasable mounting of the mounting plate allows subsequent removal of the part from the machine part. In this regard, use can be made of any form- or force-locking connection. Particularly preferably, the mounting plate for releasable mounting on the machine part comprises one or more mounting holes outside said volume.

In measurement systems, the part, e.g. a sensing head of a length measurement system, is first adjusted in a predetermined position and then mounted on the machine part, for example on a machine head of a machine tool. Of course, when setting the adjusted position, the thickness of the mounting plate has to be taken into account as well. In this connection, the mounting plate is advantageously held on the mounting surface during adjustment on said part. The same applies to the transport of a part of a measurement system until final assembly. Therefore, the measurement system preferably comprises holding means which serve, in particular, as a transport locking mechanism and by which the mounting plate is removably held on the part.

The measurement system can be simply mounted on the machine part by first adjusting the part, then mounting the mounting plate and finally producing the adhesive joint between the mounting plate and the part. This ensures mounting of the part free from stresses, so that the adjusted position is safely maintained during final assembly.

This mounting method is particularly simple if the mounting plate is held on the mounting surface of the part already during adjustment of the part. It is then merely required to mount the mounting plate on the machine part. The gap existing between the mounting plate and the machine part upon adjustment of the adjusted position is, thus, shifted to between the mounting plate and the mounting surface of the part, resulting in the desired adhesive gap for the volume for adhesive or for the pocket for adhesive.

DESCRIPTION OF THE FIGURES

The invention will be explained in more detail below, by way of example and with reference to the Figures, wherein:

FIG. 3 shows a sensing head being incorporated into the capsule profile of FIG. 2;

FIGS. 4-7 show schematic views of the final assembly of a measurement system, formed by the sensing head and the capsule profile, on a machine in individual steps of the mounting procedure;

FIG. 14 shows a perspective view of the measurement system shortly before operation.

DETAILED DESCRIPTION

Figure 1:
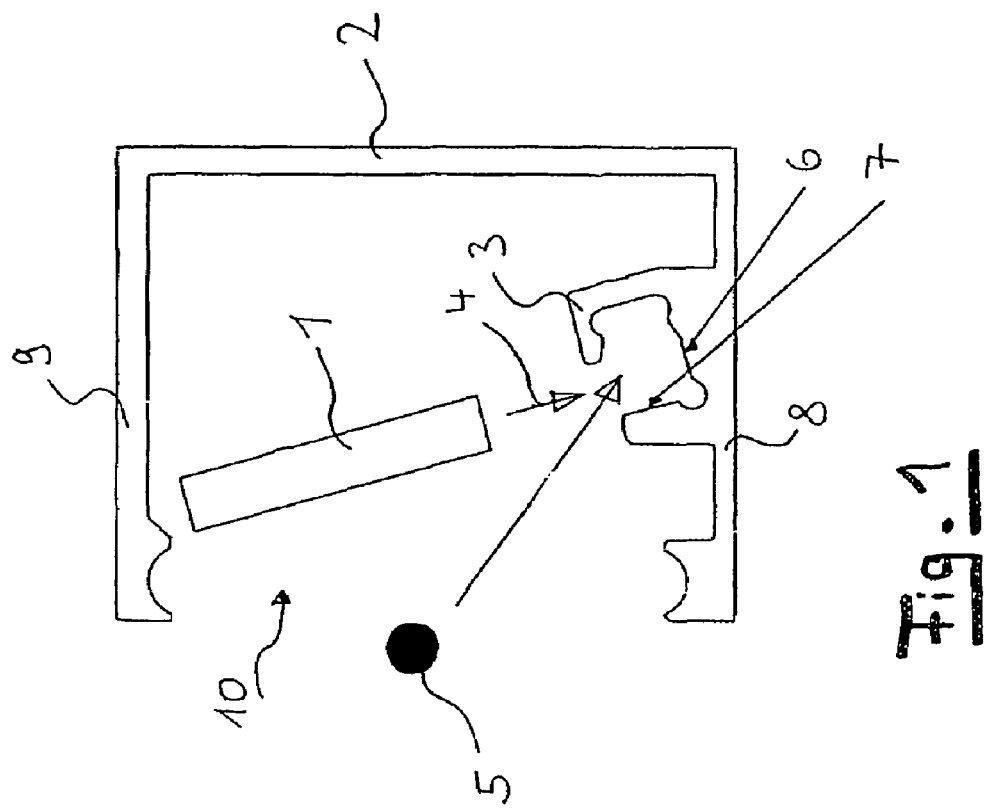
FIG. 1 shows a schematic sectionaks view of a rule of a linear measurement device having a protective capsule profile, said Figure illustrating assembly thereof.

FIG. 1 shows a sectional view of a rule 1 of a length measurement system used for a machine tool to sense the movement of a machine head relative to a machine bench. The rule 1 is inserted into a capsule profile 2 surrounding said rule 1 on three sides for protection.

A receiving portion 3 into which the rule 1 is inserted (arrow 4) is provided inside the capsule profile 2 for mounting the rule 1. A rubber band 5 acting as a bracing means is inserted into the receiving portion 3 in order to secure the rule 1 within the receiving portion 3. Since the rule 1 is later sensed in the measuring process (for which purpose it is suitably structured) and its position is, therefore, important for a precise measurement, the receiving portion 3 comprises a lower reference surface 6 as well as a lateral reference surface 7 which align the rule 1 in an exact position within the capsule profile 2 when the rubber band 5, acting as a bracing means, urges the rule 2 against the reference surfaces.

The capsule profile 2 has a U-shaped cross-section, comprising a base 8 as well as a lid 9. The capsule profile 2 surrounding the rule 1 on three sides provides good protection for the sensitive rule 1. The sensed structure of the rule 1 is located on the oblique surface of the rule 1 pointing downward in the fitting position, thus further reducing depositions of dust. The base 8 of the capsule profile 2 is provided for mounting on the machine bench of a machine tool.

Figure 2:
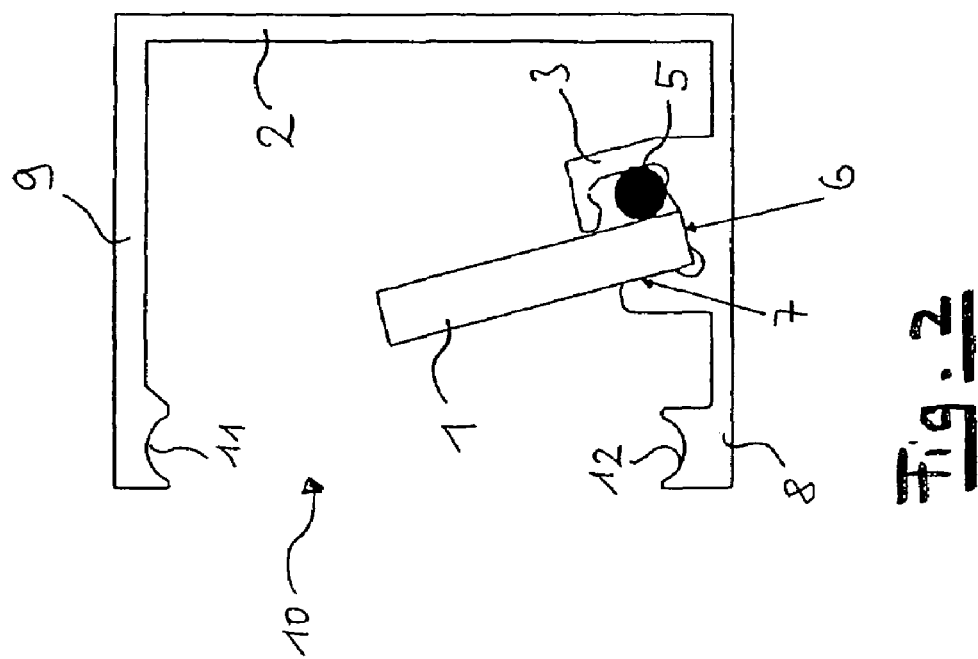
FIG. 2 shows the assembled unit of FIG. 1.

FIG. 2 shows the rule 1, incorporated into the capsule profile 2. It is clearly visible that the rule 1 in the capsule profile 2 is accessible only through an opening 10. Of course, said opening 10 is a slot, because the rule 1 extends perpendicularly to the drawing plane, and so does the capsule profile 2, which is produced, for example, from a suitably profiled aluminum strand.

The legs of the capsule profile 2, i.e. the base 8 and the lid 9, comprise holding grooves, so that an upper holding groove 11 is formed in the lid 9 and a lower holding groove 12 is formed in the base 8. These holding grooves 11, 12, in combination with a certain elasticity of the lid 9, serve to secure a sensing head inserted into the capsule profile, as will be explained below.

FIG. 3 schematically shows the sensing head 13. The sensing head 13 comprises a measuring gap 14 which, in the assembled state, trilaterally surrounds the rule 1 in a non-contacting manner and on which the measuring means (not shown) are arranged, which sense the structure (also not shown) on the rule 1 in a non-contacting manner.

The sensing head 13 has a mounting surface 15 by which it is securely mounted on the machine head of the tool machine. Further, the sensing head 13 comprises an upper groove 16 as well as a lower groove 17, which cooperate with the holding grooves 11 and 12 in the legs of the capsule profile 2 so as to ensure that the assembled capsule profile 2, comprising the rule 1 and the sensing head 13, is securely locked during transport, with the sensing head 13 and the rule 1 being locked in a predetermined, adjusted position relative to each other.

For this purpose, an upper fitting cylinder 18 and a lower fitting cylinder 19 are provided, whose diameter is dimensioned such that, inserted into the upper holding groove 11 or the lower holding groove 12, they are fixed in the groove 16 or 17 by the spring action of the lid 9, when the sensing head 13 is inserted into the capsule profile 1. For example, the fitting cylinders 18 and 19 may be provided as suitable steel wires.

The insertion operation is schematically represented by an arrow in FIG. 3, wherein the rule 1 is, of course, inserted into the measuring gap 14 of the sensing head 13 after assembly of the rule 1 and the capsule profile 2, by a movement perpendicular to the drawing plane. That is, the sensing head 13 is slid over the rule 1 at an open end of the capsule profile 2. Thereafter, the fitting cylinder 18 or 19 is introduced into the gap formed by the upper holding groove 11 and the upper groove 16 or into the gap formed by the lower holding groove 12 and the lower groove 17. The fitting cylinders are clamped by the spring action of the leg of the capsule profile 2 forming the lid 9. The capsule profile 2 securely holds the sensing head 13 between the base 8 and the lid 9, and a predetermined orientation of the sensing head 13 relative to the rule 1 is provided within narrow, precisely dimensioned tolerances.

The unit of sensing head 13, capsule profile 2 and rule 1 pre-mounted in this manner can then simply be attached to the machine by mounting the sensing head 13 and the capsule profile 2 on the machine head and the machine bench, respectively.

In one embodiment, said mounting is effected according to the steps shown in FIGS. 4 to 7. The Figures show a top view of the pre-mounted unit consisting of the capsule profile 2, the rule 1 and the sensing head 13, viewed from above (with reference to FIG. 3). For mounting on the mounting surface 15, the sensing head 13 is provided with a mounting plate 22 whose design will be explained in detail hereinafter. The sensing head 13 is mounted on the machine part 21 via the mounting plate 22. The mounting plate 22 need not yet be provided on the sensing head 13 when mounting the capsule profile 2. As will be explained hereinafter, the mounting plate 22 is only required for securely mounting the sensing head 13 on the machine head 21.

The capsule profile 2, on the inside of which the rule 1 (not shown in FIGS. 4 to 7) is located, is aligned exactly in parallel with the machine run-off, i.e., the longitudinal movement of the machine head 21. For this purpose, use is made of a mounting gauge 20 which aligns the capsule profile 2 at a predetermined distance D from the machine head 21. By moving the machine head 21 along the machine run-off direction and simultaneously applying the mounting gauge 20, an adjustment of the capsule profile 2 in parallel with the moving direction of the machine head 21 is achieved. FIG. 5 shows this operation, wherein the machine head 21 effects alignment of the capsule profile 2 by means of the mounting gauge 20.

The adjusted capsule profile 2 is mounted on the machine bench. Said mounting can be effected in many ways. The embodiment described herein uses a two-step method, wherein, first of all, a coarse alignment of the capsule profile 2 relative to the machine run-off is effected. The machine head 21 is moved to the corresponding (final) positions, and the capsule profile is aligned with the mounting gauge 20 at two points, which are as far apart as possible. After this coarse alignment, a first fixation of the capsule profile 2 may be effected, for example, by loosely tightening a screw connection.

Then, the machine head 21 including the mounting gauge 20 is moved slowly along the machine run-off and the capsule profile 2 is simultaneously fixed securely on the machine bench (not shown). In an embodiment where the capsule profile 2 is screwed on, this may be effected by securely tightening the screw connections. In embodiments where jointing of the capsule profile 2 to the machine bench is effected, said jointing may be gradually effected, for example, by removing a protective sheet from a suitable double-sided adhesive tape, which is attached to the base 8 of the capsule profile 2, as the movement of the machine head 21 progresses, so that the capsule profile 2 is securely adhered to the machine bench.

The sensing head 13, with the mounting plate 22 mounted thereon, is securely connected with the capsule profile 2 via the fitting cylinders 18 and 19, as described with reference to FIG. 3. Thus, the alignment of the capsule profile 2 in parallel with the run-off of the machine head 21 does not influence the preadjusted position of the capsule profile 2, comprising the rule 1, relative to the sensing head 13.

If the capsule profile 2 is mounted on the machine bench in exact parallel alignment with the run-off of the machine head 21 (FIG. 6), the machine head 21 is moved to the sensing head 13. In doing so, a predetermined gap 45 is formed between the mounting plate 22, which contacts the mounting surface 15 of the sensing head 13, and the machine head 21. The mounting plate 22, which was hitherto secured on the sensing head 13, is now released therefrom and screwed onto the machine part 21. The gap 45, which previously existed between the mounting plate 22 and the machine head 21, is thus shifted to between the mounting plate 22 and the sensing head 13. Said gap serves as an adhesive gap 30, which is then filled with adhesive in order to securely mount the mounting head 13 on the mounting plate 22, which is screwed onto the mounting element 21 (see FIG. 7). In doing so, the adhesive can cure free from stresses.

Upon curing of the adhesive, the connection between the mounting head 13 and the capsule profile 2 is released by pulling the fitting cylinders 18 and 19 out of the gaps formed by the upper holding groove 11 and the upper groove 16 as well as by the lower holding groove 12 and the lower groove 17.

Figure 8:
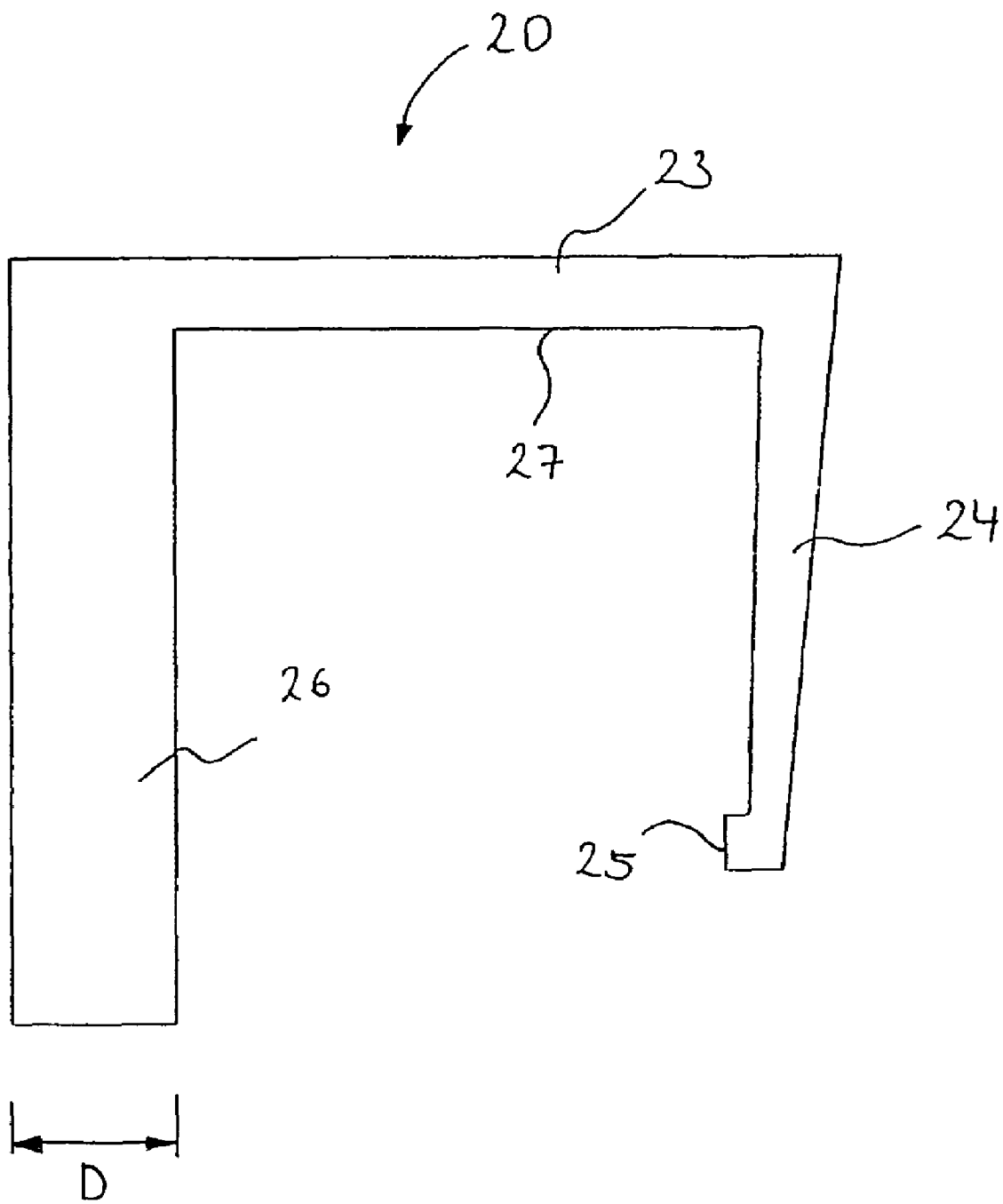
FIG. 8 shows a mounting gauge used in said final assembly.

FIG. 8 shows a sectional view of the mounting gauge 20. Said mounting gauge 20 is placed on the capsule profile 2, for which purpose it comprises a first reference arm as well as a second reference arm 24. On its side facing the capsule profile 2, the reference arm 24 has a reference surface 25, which externally contacts the capsule profile 2 approximately at the level of the rule 1. The mounting gauge 20 is supported on the lid 9 of the capsule profile 2 by a supporting surface 27, which is located on the interior surface of the first reference arm 23, said interior surface facing the capsule profile 1. An adjusting arm 26 of the mounting gauge 20 ensures that the desired distance D to the machine head 21 is present when the mounting gauge 20 is placed on the capsule profile. Thus, the adjusting arm 26 is located between the free ends of the capsule profile 2 and the machine part 21.

Figure 9:
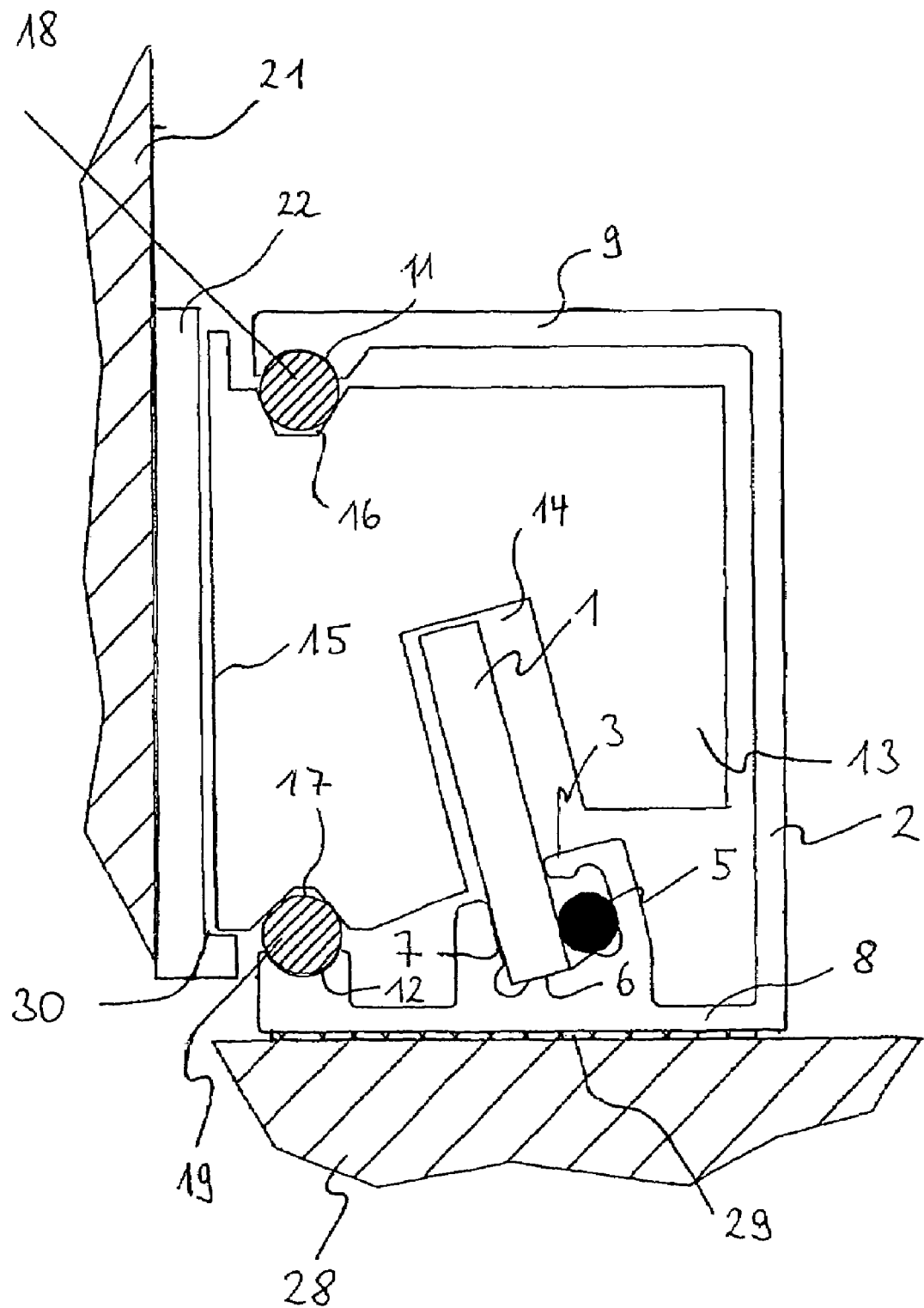
FIG. 9 shows a sectional view of the mounting condition of the measurement system shown in FIG. 7 prior to the final mounting step.

FIG. 9 shows a sectional view of the mounting condition of the measurement system as shown in the top view of FIG. 7. In this case, the capsule profile 2 is adhered to the machine bench 28 by its base 8, using an adhesive tape 29 having predetermined properties. The mounting plate 22 is securely mounted on the machine head 21 (in a manner not further shown in FIG. 9), with the gap dimension D, which is predetermined by the mounting gauge 20, resulting in a predetermined adhesive gap 30 between the mounting surface 15 of the sensing head 13 and the mounting plate 22. At its bottom, the mounting plate 22 comprises a projecting edge protrusion which limits the adhesive gap 30 towards the bottom.

Figure 10:
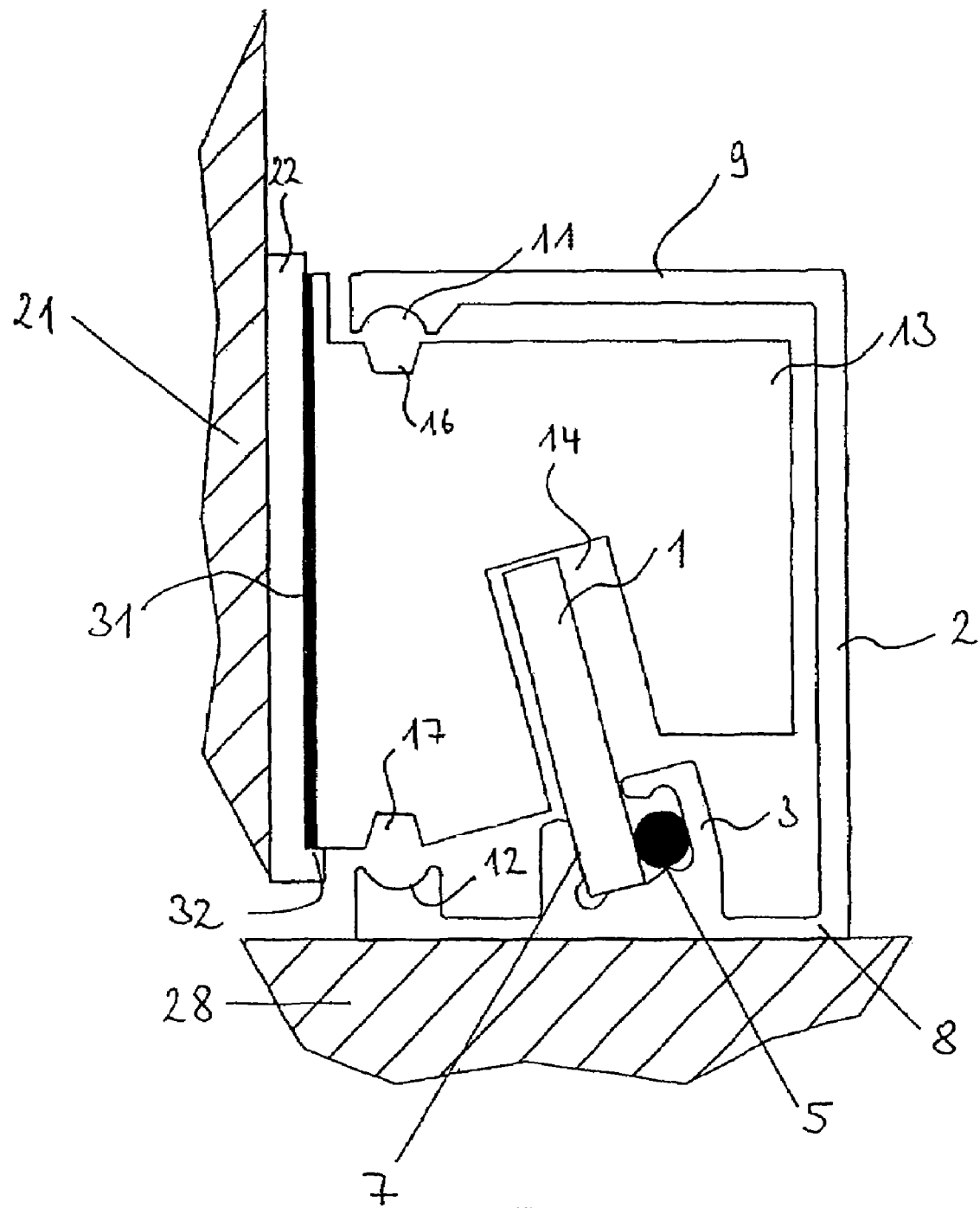
FIG. 10 shows the measurement system represented in FIG. 9, after execution of said final assembly.

FIG. 10 shows the measurement system upon completion of the mounting, the adhesive tape 29 not being represented for a simplified view. The adhesive gap 30 was filled with adhesive 31 which could not run out of the adhesive gap 30 at the bottom of the mounting plate 22, due to the edge protrusion 32. Upon removal of the upper fitting cylinder 18 from the gap formed by the upper holding groove 11 and the upper groove 16, as well as of the lower fitting cylinder 19 from the gap formed by the lower groove 17 and the lower holding groove 12, the sensing head 13 is freely movable along the run-off direction of the machine head 21 (the direction perpendicular to the drawing plane). In this case, the sensing head 13 protrudes into the capsule profile 2 and is surrounded thereby on three sides in a non-contacting manner. Thus, good protection of the sensing head 13 against soiling or mechanical damage is achieved. The sensing head 13, in turn, trilaterally surrounds the rule 1 and senses it in a non-contacting manner. Due to the alignment of the capsule profile 1 and the sensing head 13, no guiding of the sensing head 13 in the capsule profile 2 is required. The sensing head 13 is neither supported on the capsule profile 2 nor on the rule 1.

Figure 11:
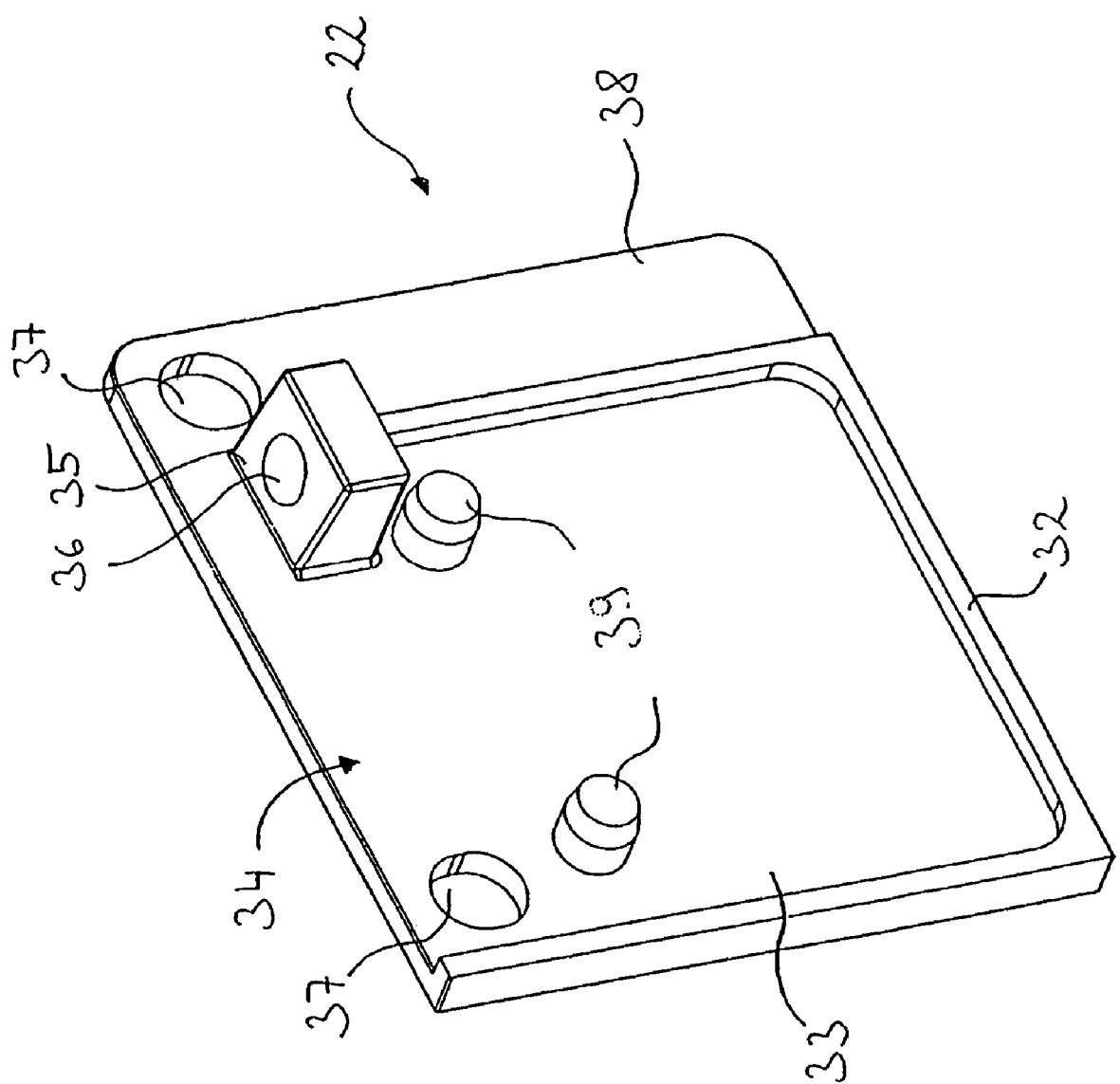
FIG. 11 shows a perspective view of a mounting plate used for mounting of the sensing head.

FIG. 11 shows a perspective view of an embodiment example of the mounting plate 22, wherein the side on which the sensing head 13 is mounted by the mounting surface 15 points to the right in the illustration. The mounting plate 22 has an edge protrusion 32 circumferentially extending in a U-shaped manner, which serves as a sealing means in order to prevent the adhesive running out, which adhesive is filled in through an opening 34 formed at the top surface, between the sensing head 13 and the mounting plate 22, in order to adhere the sensing head 13 to the mounting plate 22.

For easier filling, the mounting plate 22 has a funnel tube 35 comprising a filling opening 36 through which adhesive may be injected from a nozzle. Moreover, the mounting plate 22 has two slotted holes 37 allowing the mounting plate 22 to be screwed onto the machine part 21. This screw connection can be released if the sensing head 13 is to be removed again from the machine head 21 after an adhesive joint has been produced. Without this releasable connection between the mounting plate 22 and the machine head 21, removal of the sensing head after producing said adhesive joint would be possible only with a great effort and at the risk of damaging the machine head 21.

In this case, one of said slotted holes 27 is located in a flange 38, thus achieving particularly good access even after jointing of the sensing head 13. Moreover, providing said holes as slotted holes 37 has the advantage that greater tolerances can be allowed for the corresponding threaded holes on the machine head 21 without having to expect any effects on the precise mounting of the sensing head.

In order to secure the mounting plate 22 on the sensing head 13, until mounting of the mounting plate 22 and the subsequent jointing of the sensing head 13 have been completed, the mounting plate 22 comprises suitable holding noses 39 engaging in corresponding holding openings on the sensing head 13. In this manner, the mounting plate 22 can be fitted onto the sensing head 13, and is secured thereon against falling off until mounting is completed.

Figure 12:
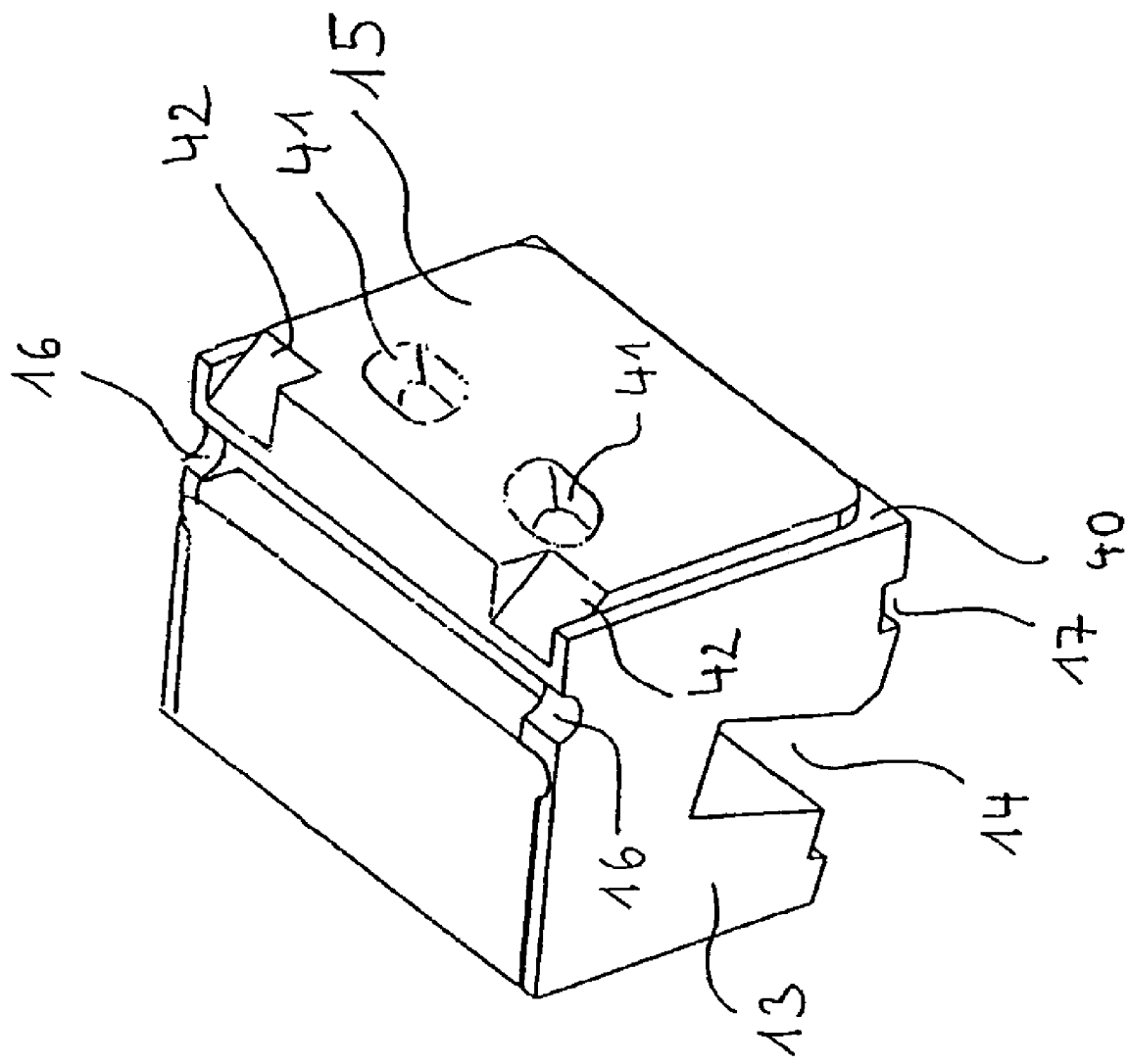
FIG. 12 shows a perspective view of the sensing head.

The holding openings 42 are clearly visible on the sensing head 13 in the perspective view of FIG. 12, which shows the mounting head 13 in a perspective view, as viewed from the mounting surface 15. As can be seen, a U-shaped recess 40 is provided on the mounting surface 15, into which recess 40 the edge protrusion 32 of the mounting plate 22 protrudes, so that a volume 33 for adhesive formed between the mounting plate 22 and the mounting surface 15, serving to receive the adhesive 31, is sealed at its bottom and lateral surfaces. Due to the viscosity of the adhesive used, it suffices, in this case, if the edge protrusion 32 simply contacts the vertical wall surface formed by the recess 40 in order to produce the desired sealing effect.

For easier filling of the adhesive 31 into the volume 33 for adhesive, the sensing head 13 has oblique inlet surfaces 42. Said oblique inlet surfaces 42 are located such that adhesive filled into the funnel tube 35 flows into the volume 33 for adhesive via the oblique inlet surface 42.

Figure 13:
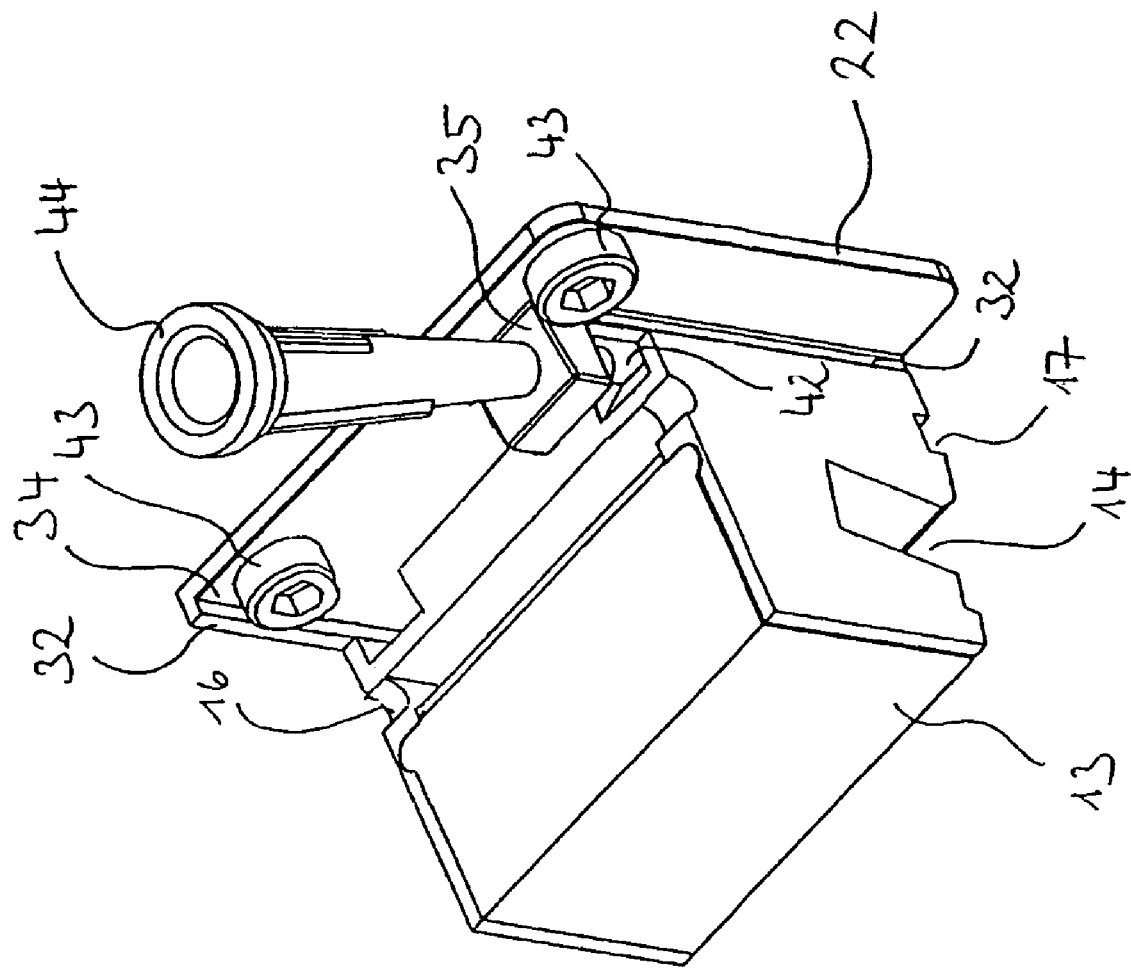
FIG. 13 shows a perspective view of the sensing head being connected with the mounting plate.

This operation is shown in FIG. 13, which shows the mounting plate 22 mounted on the machine part 21 (not shown) via screws 43. A nozzle 44 is fitted into the funnel tube 35, said nozzle 44 serving to introduce adhesive into the volume 33 for adhesive, via the oblique inlet surface 42, so as to adhere the sensing head 13 to the mounting plate 22. The U-shaped circumferential edge 32 of the mounting plate 22, which protrudes into the recess 40 on the mounting surface 15 of the sensing head 13, ensures that the adhesive introduced does not flow out of the bottom or the sides of the volume 33 for adhesive.

In the embodiment described herein, the sensing head 13 is secured, by the capsule profile 2, in the position adjusted relative to the machine part 21 (not shown) during jointing. However, for a better overview, the capsule profile 2 is not represented in FIG. 13.

FIG. 14 shows the condition after jointing, just before completion of the final assembly, now representing the capsule profile 2 including the rule 1. As can be seen, the sensing head 13 protrudes deeply into the capsule profile 2. The sensing head 13 embraces the rule 1 on three sides, without contacting it or being supported thereon, upon completion of the final assembly, i.e. upon removal of the fitting pieces. In FIG. 14, the upper fitting cylinder 18 has already been withdrawn from the upper holding groove 11 and fro the upper grooves 16 (hidden in this view) of the sensing head 13, whereas the lower fitting cylinder 19 has not yet been withdrawn. Upon removal of the lower fitting cylinder 19 from the lower holding groove 12 and from the lower groove 17, the sensing head 14 mounted on the machine head 21 is freely movable along the rule 1, the path of its movement being defined by the movement of the machine head 21. In case the sensing head 13 is to be released from the machine head 21, the screws 43 may be screwed out, thus enabling removal of the sensing head 13, together with the mounting plate 22, from the machine head 21.

The invention claimed is:

1. A length measurement system for measuring relative movements between first and second machine parts, said measurement system comprising a sensing head and a rule sensed by it, said sensing head being securely mountable on the first machine part and said rule being connectable with the second machine part during final assembly of the length measurement system, wherein the rule is mounted within a profiled part having two legs which is securely mountable on the second machine part during final assembly and into which the sensing head protrudes, said sensing head being prepositioned, via a removable mounting structure, and being releasably connected with said profiled part, when in a state prepared for final assembly, wherein in the state prepared for final assembly, the mounting structure connects the two legs of the profiled part with the sensing head; and wherein the mounting structure comprises two spacing members which are clamped within grooves of the sensing head by the profiled part.

2. The length measurement system as claimed in claim 1, wherein the profiled part comprises an adhesive surface by which it can be adhered to the second machine part.

3. The length measurement system as claimed in claim 1, wherein the profiled part comprises a U-shaped profile comprising the two legs, one of said legs being mounted on the second machine part and carrying, at its interior surface, the rule, and the other of said legs embracing the sensing head in a non-contacting manner during measurement.

4. The length measurement system as claimed in claim 1, wherein-the sensing head, when having been finally assembled and after the mounting structure has been removed, protrudes into the profiled part without being supported thereon.

5. The length measurement system as claimed in claim 4, wherein the two spacing members are each of cylindrical cross-section.

6. The length measurement system as claimed in claim 1, wherein the profiled part comprises a reference surface aligning the rule, which reference surface is contacted by the rule in its mounted state.

7. The length measurement system as claimed in claim 6, wherein a bracing device braces the rule in a direction toward the reference surface.

8. The length measurement system as claimed in claim 1, wherein during measurement, the sensing head protruding into the profiled part embraces the rule mounted thereon in non-contacting manner on three sides of the rule.

9. A method of final assembly of a length measurement system as claimed in claim 1, comprising:

for final assembly, aligning the profiled part with and mounting the profiled part on the second machine part, mounting the sensing head securely on the first machine part in a gap-filling manner, and removing the mounting structure so as to release the connection between the profiled part and the sensing head.

10. The method as claimed in claim 9, further comprising roughly aligning the profiled part with a longitudinal axis of the relative movement and adjusting the profiled part, by means of a gauge, along said longitudinal axis, to be at a constant distance from the first machine part, and moving the first and second machine parts relative to each other so as to adjust the constant distance.

11. The method as claimed in claim 10, further comprising adjusting a distance using the gauge, said distance resulting in a predetermined gap between the first machine part and the sensing head prior to mounting the sensing head on the first machine part.

12. The method as claimed in claim 9, further comprising adhering at least one of the sensing head and the profiled part to the first and second machine parts, respectively.

13. A method of final assembly of a length measurement system, the length measurement system for measuring relative movements between first and second machine parts, said measurement system comprising a sensing head and a rule sensed by it, said sensing head being securely mountable on the first machine part and said rule being connectable with the second machine part during final assembly of the length measurement system, the method comprising:

mounting the rule within a profiled part that has two legs and which is securely mountable on the second machine part during final assembly and into which the sensing head protrudes, prepositioning the sensing head via a removable mounting structure which includes two spacing members, and establishing a connection between the sensing head and said profiled part, when the sensing head and the profiled part are in a state prepared for final assembly, which connection is releasable and maintains relative positions of the sensing head and the profiled part, by clamping the two spacing members of the mounting structure between the two legs of the profiled part and the sensing head; and into grooves of the sensing head.

14. A method of final assembly of a length measurement system, the length measurement system for measuring relative movements between first and second machine parts, said measurement system comprising a sensing head and a rule sensed by it, said sensing head being securely mountable on the first machine part and said rule being connectable with the second machine part during final assembly of the length measurement system, the method comprising:

mounting the rule within a profiled part having two legs which is securely mountable on the second machine part during final assembly and into which the sensing head protrudes, preadjusting the sensing head such that after being finally assembled, the sensing head will protrude into the profiled part without being supported thereon;

positioning a mounting structure having two spacing members such that, in the state prepared for final assembly, the two spacing members of the mounting structure connect the two legs of the profiled part with the sensing head so as to maintain relative positions of the profiled part and the sensing head;

wherein the two spacing members are clamped between the sensing head and the profiled part and into grooves of the sensing head.

15. The method as claimed in claim 13, further comprising:

assembling the first machine part and the second machine part; and removing the two spacing members of the mounting structure from between the sensing head and the profiled part to allow free relative movement of the sensing head and the rule without contact between the sensing head and the rule.

16. The method as claimed in claim 14, further comprising: assembling the first machine part and the second machine part; and removing the two spacing members of the mounting structure from between the sensing head and the profiled part to allow free relative movement of the sensing head and the rule without contact between the sensing head and the rule.

\* \* \* \* \*